United States Patent [19]

Jacomini

[11] 4,048,637
[45] Sept. 13, 1977

[54] RADAR SYSTEM FOR DETECTING SLOWLY MOVING TARGETS

[75] Inventor: Omar J. Jacomini, Severna Park, Md.

[73] Assignee: Westinghouse Electric Corporation, Pittsburgh, Pa.

[21] Appl. No.: 669,550

[22] Filed: Mar. 23, 1976

[51] Int. Cl.² ............................................. G01S 9/42
[52] U.S. Cl. .................................. 343/7.7; 343/5 PD
[58] Field of Search ............... 343/7.7, 5 PD, 112 CA

[56] References Cited

U.S. PATENT DOCUMENTS

| 3,815,131 | 6/1974 | Dautel et al. | 343/7.7 |
| 3,903,520 | 9/1975 | Shostak | 343/5 PD |
| 3,975,734 | 8/1976 | Payne | 343/7.7 |

Primary Examiner—S. C. Buczinski
Attorney, Agent, or Firm—H. W. Patterson

[57] ABSTRACT

A bistatic radar system for detecting the presence of a slowly moving target by the use of an arrangement which provides a reduction in the frequency spread of the reflected clutter energy. A radar transmitter and a radar receiver are located aboard separate aircraft which fly with a predetermined speed and direction about the target area. The speed and direction of the two aircraft are such that the angular velocities of the aircraft about the target area are substantially equal and opposite. This arrangement reduces the spread of the reflected clutter energy caused by motion of the radar transmitter and receiver relative to the target area. The radar return signals are filtered and processed to determine when a signal is present which has been shifted in frequency due to the motion of the moving target. In one embodiment, the two aircraft fly directly toward each other at the same speed. In another embodiment, the two aircraft fly directly away from each other at the same speed. Apparatus is included which determines the position of the moving target both with respect to the two aircraft and with respect to the ground.

14 Claims, 7 Drawing Figures

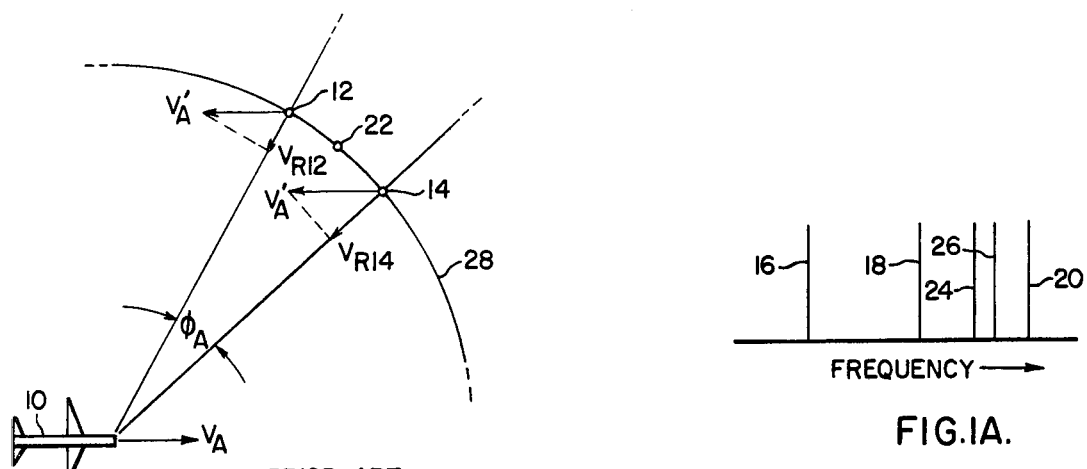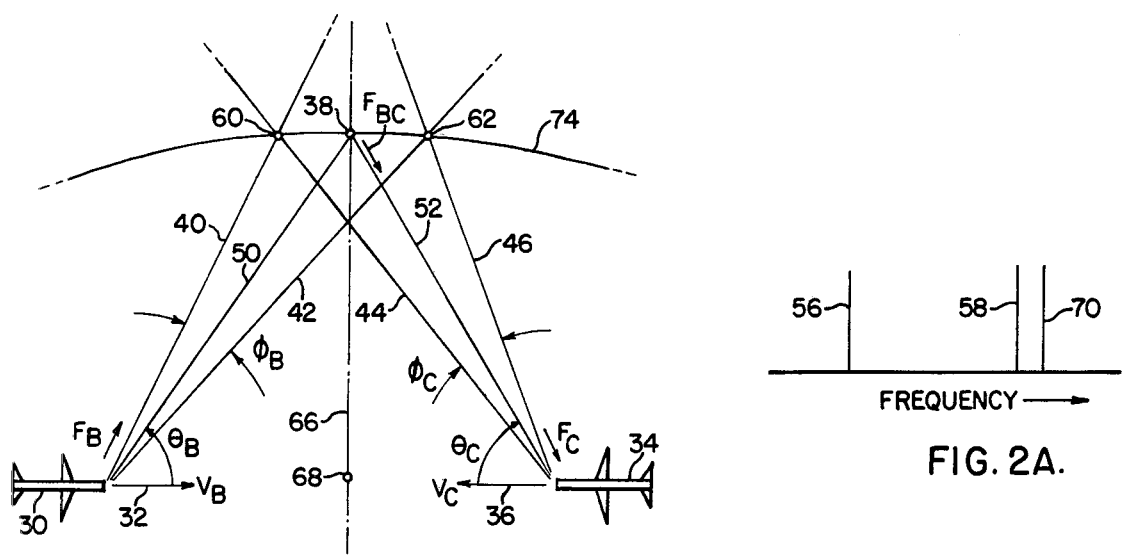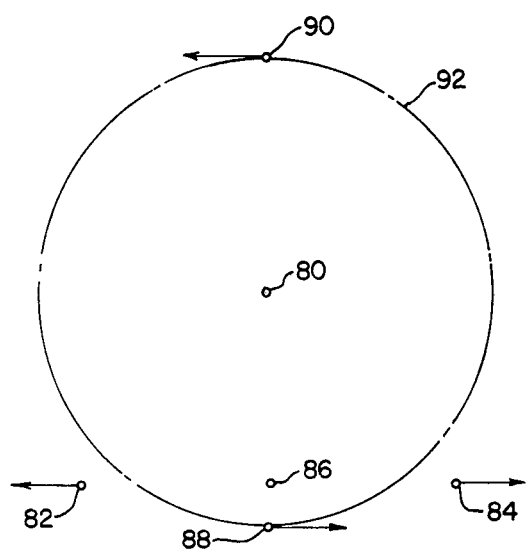

RADAR SYSTEM FOR DETECTING SLOWLY MOVING TARGETS

BACKGROUND OF THE INVENTION

1. Field of the Invention

This invention relates, in general, to radar systems and, more specifically, to airborne radar systems which detect moving targets.

2. Description of the Prior Art

Airborne radar systems are always susceptible to the reception of ground clutter signals when scanning the ground for radar targets. The ground clutter return signals are reflections from the ground and various objects in the target area which are not regarded as targets. The conventional way to detect moving targets is to detect a return signal which has a frequency which has been shifted from the originally transmitted radar signal frequency. The shift in radar frequency occurs due to the Doppler effect caused by the movement of the target.

In addition to the Doppler effect caused by the movement of the target, shifts in frequency also occur due to the movement of the aircraft containing the radar components. When the frequency shift due to the motion of the target is sufficient, the radar apparatus can detect this frequency shift against the background of other signals returned from the target area. Thus, a moving target can be detected. However, with conventional radar systems, the speed of the moving target must be relatively high in order for the radar system to detect a sufficient amount of Doppler shift to recognize the target.

In a typical monostatic radar system in which the radar transmitter and receiver are located aboard the same aircraft, the speed of a moving target on the ground is often not great enough to produce a shift which can be recognized by the radar system. Detecting moving targets, such as other aircraft, is not such a difficult problem due to the relatively high speed of the target. However, slowly moving targets on the ground, such as trucks and tanks, are difficult to detect from airborne radar systems.

The limiting factor involved in the detection of moving targets from airborne radar systems is the spread or width of the frequencies existing in the ground clutter or return clutter from the target area. With conventional monostatic radar systems, the amount of ground clutter spread existing in the frequency spectrum of the received radar signal is dependent upon the speed of the aircraft with respect to the target area, and is also dependent upon other factors. With a wide spread in frequency, it is difficult to detect a Doppler shift which is small since the frequency received by the radar system receiver is masked by the ground clutter signals. Therefore, to sufficiently detect slowly moving targets within the target area, it is necessary to reduce the amount of Doppler shift spread received due to the ground clutter return.

The spread of the ground clutter is dependent upon the beamwidth of the antenna, since the smaller the area on the ground whhich is illuminated by the radar transmitter, the smaller will be the frequency extremes from leading to trailing edges of the radar beam produced by the ground clutter. Therefore, a narrow beam-width is helpful in reducing the amount of ground clutter spread in the received radar signal. However, narrow beamwidth cannot be obtained easily without increasing the size of the radar antenna or by increasing the frequency of the transmitted radar signals. Increasing the size of the radar antenna is seldom practical in airborne radar systems. Using higher frequencies is technically feasible but presents other problems, such as excessive attenuation by the atmosphere and excessive back scattering from rain. Therefore, the advantages gained by increasing the frequency to produce a narrower beamwidth are to a large extent counteracted by the distances of using a higher radar frequency.

Other techniques may be used to reduce the amount of return signal spread from the ground clutter, such as by the use of displaced phase center antennas. U.S. Pat. No. 3,438,030, issued on Apr. 8, 1969, describes such a system. However with such systems, it is important that the antenna sections give precisely the same performance, thus construction and adjustment of such an antenna system is critical for proper operation. In addition, a displaced phase center antenna radar system can only use a few number of pulses in the transmitter radar signal instead of a large number of radar pulses. As is well known to those skilled in the radar art, using many pulses in the radar signal permits easier filtering of the return signal at the radar receiver.

Therefore, it is desirable, and it is an object of this invention, to provide a radar system for detecting moving targets which does not require displaced phase center antenna arrangements and does not require the use of a higher transmitting frequency. It is an object of this invention to provide a radar system which is capable of detecting slowly moving objects when the radar system is located aboard relatively fast moving aircraft platforms.

SUMMARY OF THE INVENTION

There are disclosed herein new and useful radar system arrangements for detecting the presence and location of a slowly moving radar target. The radar system includes a radar transmitter located aboard one aircraft which is traveling in a predetermined direction at a predetermined speed. A radar receiver is located aboard another aircraft which is traveling in another predetermined direction at a predetermined speed. The directions and speeds of the two aircraft are selected such that the angular velocities of the two aircraft around the target area are approximately equal and opposite to each other. With this angular velocity relationship, the Doppler shift spread occasioned by the transmitting aircraft for substantially all of the points within the ground clutter region is effectively counteracted by Doppler shifts in the opposite direction occasioned by the relative motion of the receiving aircraft with respect of the ground clutter or target area. Consequently, the overall spread or amount of frequencies existing in the received radar signal as a result of reflections from objects in the target area not considered as targets is significantly reduced. By reducing the ground clutter spread, the frequencies of the radar signal which are masked by the ground clutter spread are also significantly reduced. Due to this reduction, it is only necessary that the moving target produce a slight different in frequency of the reflected radar signal in order to provide adequate detection at the radar receiver.

In one embodiment of the invention the two aircraft are traveling at the same speed in directions which are directly toward each other. In another embodiment of the invention, the two aircraft are traveling in directions which are exactly away from each other and at the same speed. In either case, the midpoint between the two aircraft remains stationary with respect to the target area of concern. In still another embodiment of the invention, three aircraft are used in a bilateration technique to accurately determine the position of the moving target. In the latter arrangement, two separate range or position ellipses are determined by the three aircraft and the intersection of these range ellipses indicates very precisely the location of the moving target.

Suitable apparatus is located either aboard the transmitting aircraft or the receiving aircraft, or at a ground processing station, to interpret the received radar signals and to coordinate the movement of the transmitting and receiving antennas. This apparatus also sends information to the radar receiver corresponding to the phase and timing of the transmitted radar signal. Positioning apparatus is also included which determines the location of the target with respect to the two aircraft and, if it is desired, with respect to the true ground location.

The bistatic radar system described herein permits the detection of moving targets from airborne radar systems when the target is moving at a speed which is less than that which would be detectable by conventional prior art radar systems. In addition, this improvement in detection velocity is obtainable even though the exact speeds and directions of the two aircraft are not maintained within close tolerance. Even when the speeds and directions of the aircraft are not exactly as recommended, the cancellation or counteracting of the Doppler shifts for the ground clutter return is sufficient to reduce the ground clutter spread enough to permit detection of the moving target much easier than that obtainable according to prior art monostatic radar systems.

BRIEF DESCRIPTION OF THE DRAWINGS

Further advantages and uses of this invention will become more apparent when considered in view of the following detail description and drawing, in which:

FIG. 1 is a diagram illustrating a monostatic radar system operating according to the prior art;

FIG. 1A is a plot of a radar signal return for the radar system shown in FIG. 1;

FIG. 2 is a diagram illustrating a bistatic radar system operating according to one embodiment of this invention;

FIG. 2A is a plot of a radar signal return for the radar system shown in FIG. 2;

FIG. 3 is a diagram illustrating various flight patterns which may be used with the radar system of this invention;

DESCRIPTION OF THE PREFERRED EMBODIMENTS

Figure 4:
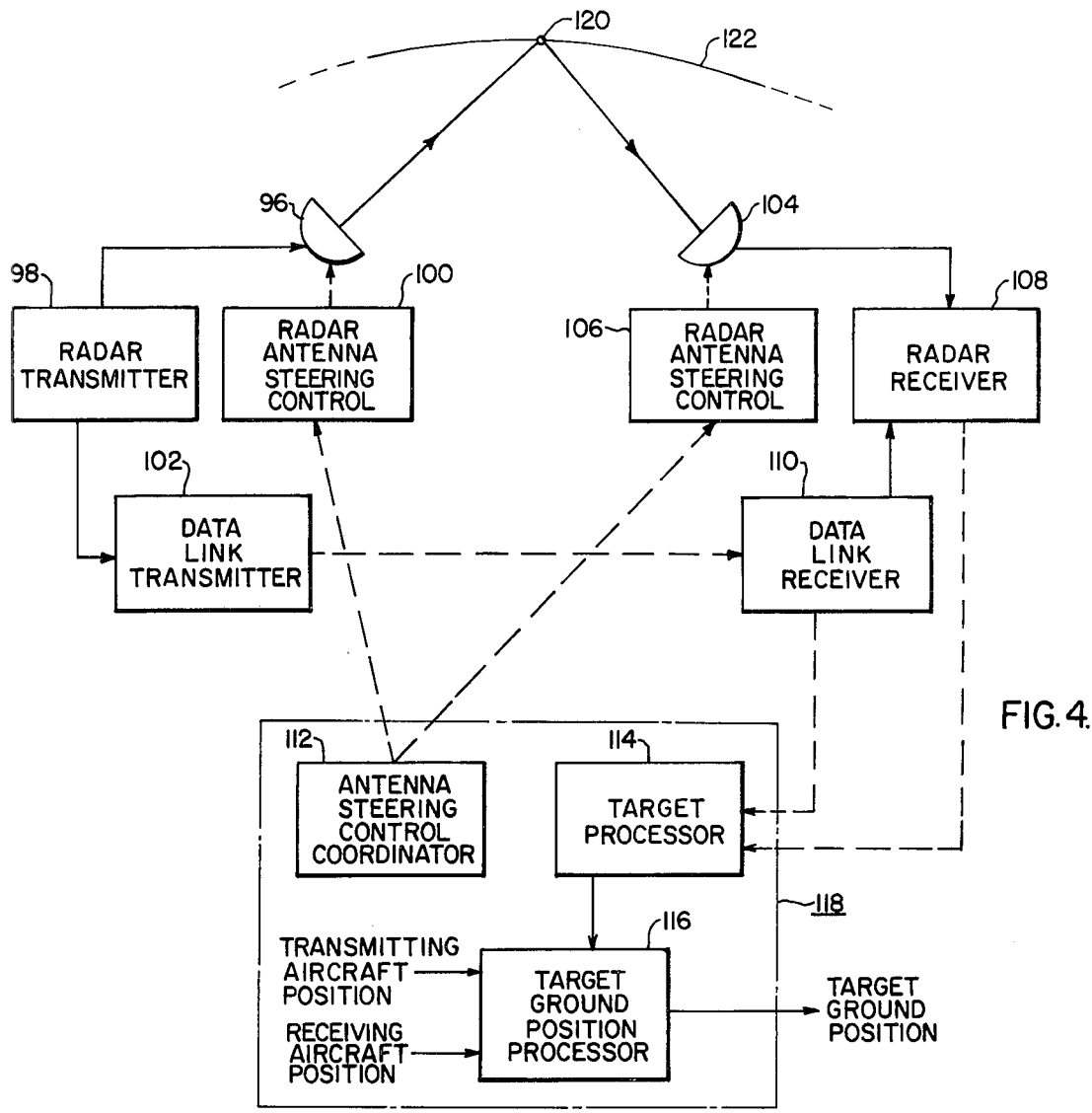
FIG. 4 is a block diagram showing the major components of the radar system shown in FIG. 2.

Throughout the following description, similar reference characters refer to similar elements or members in all of the figures of the drawing.

Referring now to the drawing, and to FIG. 1 in particular, there is shown a diagram of a monostatic radar system operating according to prior art techniques. The aircraft 10 serves as the platform for the radar transmitter and receiver components. Due to the finite beamwidth $\phi_A$ of the radar antenna, return signals can be detected from more than one location, either from an object regarded as a target or from other objects on the ground and from the ground itself. Such "ground clutter" makes it difficult to detect a moving target with the monostatic radar system shown in FIG. 1.

The radar system in FIG. 1 is capable of receiving signals from the locations 12 and 14 simultaneously since these locations are within the antenna beamwidth. However, since the aircraft 10 is traveling at a different velocity with respect to each location, a difference exists in the Doppler shift of the return signals from each location. By assuming, for illustrative purposes, that the aircraft 10 is fixed and that the relative motion is caused by the movement of the locations 12 and 14 at a velocity $V^1_A$, it can be seen that the radial velocities $V_{R12}$ and $V_{R14}$ must be different since the direction of the radial velocity to the aircraft 10 is different for the locations 12 and 14.

FIG. 1A is a plot of pertinent frequencies existing in the system shown in FIG. 1. Referring to both FIGS. 1 and 1A, the frequency represented by line 16 in FIG. 1A corresponds to the frequency transmitted by the radar system from the aircraft 10. Due to the radial velocity $V_{12}$, the frequency of the signal reflected from location 12 appears to have increased in frequency due to the Doppler effect. The reflected frequency for location 12 is indicated by line 18 in FIG. 1A. Similarly, the frequency of the signal reflected from location 14 is indicated by the line 20 in FIG. 1A. Line 20 represents a higher frequency than the line 18 since the radial velocity of the location 14 is larger than the radial velocity of the location 12. Since the radar system is capable of receiving ground clutter signals reflected from anywhere between the locations 12 and 14, many more than two discrete frequencies will be received by the radar system due to ground reflections. Thus, a spread of frequencies would actually exist in FIG. 1A between lines 18 and 20 when all of the reflecting locations within the antenna beamwidth are considered.

The spread of received frequencies makes it difficult to detect a moving target within the area scanned by the radar antenna. If a stationary target is positioned at location 22 as shown in FIG. 1, it will produce a return signal which has a frequency shift such that the received frequency spectrum would include the line 24 shown in FIG. 1A. Line 24 is shifted from line 16 due to the Doppler effect created by the motion of the aircraft 10. However, since the line 24 is located within the clutter frequency spread, filtering techniques at the radar receiver cannot distinguish the target 22 from the ground clutter.

A moving target produces a Doppler shift which is different than that produced solely by the motion of the aircraft. When the speed of the target is sufficient, the Doppler shift is great enough to produce a frequency which lies outside the ground clutter. Thus, filtering of the received signal will allow detection of such a moving target. The range of the target thus detected is known to be somewhere on a position circle, of which the arc 28 is a segment, due to knowledge about the elapsed time required for the return of the radar signal. However, when the target is moving relatively slowly, the Doppler shift is small and the resultant frequency is located within the ground clutter frequencies, such as represented by the line 26. Therefore, the radar system illustrated in FIG. 1 is only useful for detecting targets when their speed is relatively high due to the effects of the ground clutter. In many instances the speed of an object regarded as a target is lower than this minimum detectable velocity (MDV) and thus the target cannot be detected with conventional radar systems.

FIG. 2 is a diagram illustrating one arrangement of a radar system operated according to this invention. Aircraft 30 is flying at a velocity $V_B$ in the direction indicated by arrow 32. Similarly, aircraft 34 is flying at a velocity $V_C$ in the direction indicated by the arrow 36, which is coincident and anti-parallel to the arrow 32 and along the same line of flight as the arrow 32 disregarding directions. Although they may be reversed, it will be assumed that the radar transmitter is located on board aircraft 30 and that the radar receiver is located on board aircraft 34. Consequently, the radar signal is directed toward the target location 38 and confined mainly between the lines 40 and 42 which are the boundaries of the antenna beamwidth $\phi_B$. Any reflcted signals from the target area are picked up by the radar receiving antenna which has a beamwidth $\phi_C$ which is bounded in FIG. 2 by the lines 44 and 46. As will be described more fully hereinafter, the received signals at aircraft 34 consist of those reflected from the target location 38 and those reflected from the ground and other stationary objects in the vicinity of the target location and within the antenna beamwidths.

An analysis of FIG. 2 will indicate significant relationships between the transmitter, receiver and target which make this arrangement capable of detecting targets which have a relatively slow velocity. Assuming that the radar frequency transmitted if $F_B$ and that the angle between the velocity vector $V_B$ and the line 50 to the target location 38 is $\theta_B$, the frequency of the reflected radar signal from target location 38 is given by the equation:

$$F_{BC} = F_B + \frac{V_B}{\lambda_B} \cos \Theta_B \qquad (1)$$

where $\lambda_B$ is the wave length of the transmitted radar signal. The signal received at the aircraft 34 over a path defined by the line 52 is given by the equation:

$$F_C = F_{BC} + \frac{V_C}{\lambda_{BC}} \cos \Theta_C \qquad (2)$$

where $\lambda_{BC}$ is the wave length of the reflected radar signal. Combining equations (1) and (2) provides $$F_C = F_B + \frac{F_B}{C} V_B \cos \Theta_B + \frac{F_{BC}}{C} V_C \cos \Theta_C \qquad (3)$$

where C is the velocity of propagation of the radar signals. Combining equations (1) and (3) provides $$F_C = F_B + F_B \frac{V_B}{C} \cos \Theta_B + \qquad (4)$$

$$(F_B + F_B \frac{V_B}{C} \cos \Theta_B) \frac{V_C}{C} \cos \Theta_C$$

which may be expanded to $$F_C = F_B + F_B \frac{V_B}{C} \cos \Theta_B + F_B \frac{V_C}{C} \cos \Theta_C + \qquad (5)$$

$$F_B \frac{V_B V_C}{C^2} \cos \Theta_B \cos \Theta_C$$

Since $V_B/C$ is much less than 1, and since $(V_B V_C)/C^2$ is much less than $V_B/C$, equation (5) may be approximated with reasonable accuracy by eliminating the term containing $(V_B V_C)/C^2$, thus yielding $$F_C \approx F_B (1 + \frac{V_B}{C} \cos \Theta_B + \frac{V_C}{C} \cos \Theta_C) \qquad (6)$$

Equation (6) represents the frequency received aircraft 34. Due to the Doppler effect, frequency $F_C$ is shifted from the transmitted frequency $F_B$. FIG. 2A represents the relative position of the transmitted and received radar frequencies, with the line 56 representing the transmitted frequency and with the line 58 representing a received frequency which has been shifted. Along with the reception of radar signals from the target location 38, ground clutter signals will be received from various locations between and including locations 60 and 62 shown in FIG. 2. However, an interesting relationship exists for the two propagation paths provided by the locations 60 and 62. For the path transversing the lines 40 and 44, the angle $\theta_B$ in equation (6) must be changed to $\theta_B$ plus $\phi B/2$ and the angle $\theta_C$ must be changed to $\theta_C$ minus $\phi C/2$. By decreasing one angle by the same amount the other angle is increased, the value for $F_C$ given by equation (6) does not change appreciably when the aircraft velocities are equal. Thus, the total Doppler shift for ground clutter signals reflected from location 60 produces a frequency which is generally aligned with the line 58 shown in FIG. 2. Therefore, the signals from the locations 60 and 38 have substantially the same frequency.

A similar observation can be made regarding the increase and decrease in angles to the ground clutter location 62. That is, the frequency of the signals reflected from location 62 and traversing the lines 42 and 46 is essentially equal to the frequency represented by line 58 in FIG. 2A. Therefore, it can be seen that all of the ground clutter signals received by aircraft 34 are of approximately the same frequency when the relationships shown in FIG. 2 exist. The significance of this is the fact that with all of the frequencies being nearly the same, the frequency spread due to the Doppler effect on the clutter signals is very small. Along the line 66 which intercepts the midpoint 68 of the aircraft, the Doppler spread is practically zero. Even away from the line 66, the spread is sufficiently small to be of significant benefit.

The benefit of a small Doppler spread lies in the fact that it is easier to detect a moving target located within the area from which the ground clutter is received. If, in FIG. 2, the target location 38 represents a target which is moving relative to the ground, a different Doppler shift will occur. Line 70 shown in FIG. 2A represents the position of the received radar signal from the moving target location 38 relative to the transmitted frequency indicated by line 56. Since the Doppler spread is very small, all of the ground clutter signals will be approximately aligned with the line 58 shown in FIG. 2A.

The ground clutter may include frequencies which are slightly different than the frequency represented by line 58 when the ground clutter area is removed from the region along the "ideal" line 66. However, even in this instance, the radar system of this invention limits the Doppler spread to a small distance on either or both sides of the line 58. Consequently, the signal from the moving target is located sufficiently outside the ground clutter frequencies and can be detected by using suitable filters in the radar receiving system. It should be apparent that the smaller the clutter frequency spread, the less Doppler shift required for detecting a moving target. Thus, with the radar system of this invention, the very small clutter frequency spread allows detection of targets moving at slower rates of speed than that detectable by prior art radar systems which were limited by the small Doppler shift of the target signals lying within the frequencies of the clutter signals.

The unique reduction in the Doppler spread of the ground clutter occurs even though both the radar transmitter and receiver systems are moving with respect to each other and with respect to the target area. The reduction in Doppler spread occurs when the rate of change of the angle from the radar transmitter to the target area is equal and opposite to the rate of change of the angle from the radar receiver to the target area. This angular velocity relationship occurs when the two aircraft are flying directly toward each other at the same rate of speed as the in FIG. 2 and the target area is somewhere along the line 66. As previously stated, even when the target area is not on the ideal line 66, the clutter spread is still significantly reduced when the aircraft are moving in the directions described herein. For example, a slowly moving target located anywhere on the position ellipse, of which line 74 is a segment, could be detected more readily using the component arrangement of this invention compared to prior art techniques.

Othr variables in the operation of the transmitting and receiving aircraft may be changed and still allow the system described herein to provide better detection of moving targets than conventional monostatic radar systems. The speeds and directions of the two aircraft may be altered somewhat without destroying the advantages of reducing the clutter spread relative to monostatic radar systems. Therefore, deviations from a precise angle, speed, or direction will still enable the bistatic radar system described herin to provide detection of targets moving at speeds slower than that detectable by conventional monostatic radar systems.

In the idealized arrangement shown in FIG. 2, the velocity of the aircraft 30 and 34 are exactly equal and opposite. This makes the midpoint 68 remain at the same position during the flight of the aircraft. Other patterns of flight for the two aircraft may be used which provide a stationary midpoint between the two aircraft when flying at the same speed. FIG. 3 illustrates some of these other aircraft flight patterns.

In FIG. 3, point 80 represents a target location which may be illuminated by the transmitting aircraft. Point 82 represents a transmitting aircraft and point 84 represents a receiving aircraft, hereinafter referred to as aircraft 82 and aircraft 84. The transmitting aircraft 82 is flying at the same speed as aircraft 84 but in the opposite direction. Therefore, the midpoint 86 remains stationary with respect to the target point 80, neglecting the motion of the target. In other words, the midpoint 86 is always midway between the aircraft 82 and 84 during their flight while scanning the target area.

The aircraft 88 and 90 may also be used to scan the target area and detect slowly moving targets therein. Aircraft 90 is traveling at the same rate of speed as the aircraft 88 but in a different line of motion or flight path and in the opposite direction. In this instance, the midpoint between aircraft 88 and 90 is fixed and is coincident with the target point 80 shown in FIG. 3. To keep the angular velocities constant about a target area located at point 80, the aircraft 88 and 90 may fly in a circular pattern 92 about the target area. Whatever the absolute motion of the aircraft, it is necessary to synchronize the orientation of the transmitting and receiving antennas so that signals reflected from a target are able to enter the receiving antenna at an angle within the antenna beam-width.

FIG. 4 is a block diagram showing various components of a bistatic radar system constructed according to this invention. The transmitting antenna 96, the radar transmitter 98, the radar antenna steering control 100, and the data link transmitter 102 are located aboard the transmitting aircraft. The receiving antenna 104, the radar antenna steering control 106, the radar receiver 108, and the data link receiver 110 are located aboard the receiving aircraft. The antenna steering control coordinator 112, the target processor 114, and the target ground position processor 116 are shown in FIG. 4 located at the ground station 118. However, it is within the contemplation of this invention that some or all of the elements at the ground station may be located in either of the two aircraft.

The antenna steering control coordinator 112 is coupled by a suitable data link to the radar antenna steering controls 100 and 106. The controls 100 and 106 determine the relative positions of the transmitting antenna 96 and of the receiving antenna 104. The coordination is such that the reflected energy from a target, such as target 120, arrives at the receiving antenna 104 when it is pointed properly to realize the most gain for the received signal. This would be true when the two antennas are aimed with their maximum angle of radiation directly toward the target 120, with a slight variation due to propagation time of the radar wave and the motion of the aircraft.

The radar transmitter 98 is controlled by circuitry located within the transmitting aircraft.Along with application of the radar signals to the transmitting antenna 96, suitable reference signals are applied to the data link transmitter 102. This intelligence is transmitted to the data link receiveer 106 aboard the receiving aircraft for the purpose of conveying information about the exact radar frequency and timing reference which is needed to accurately interpret the signals reflected from the target 120. Other arrangements may be used to convey this information to the radar receiving aircraft, such as by direct detection of the transmitted radar signal from the main antenna sidelobes or by tracking the ground return clutter.

The radar receiver 108 detects the direct radar and reference signals and sends the detected information over a suitable data link to the target processor 114. The target processor 114 processes this information and determines the position of the target with respect to the two aircraft. Once this relative position is known, the target ground position processor 116 can determine the ground location of the target by using information acquired about the location of the aircraft with respect to ground. It is emphasized that the exact ground location of the target 120 may not be required if only the relative location of the target and the aircraft is sufficient, such as may be the situation if a weapon system was to be deployed from one of the aircraft.

The location of the target 120 determined by the arrangement shown in FIG. 4 is confined to a spot on a position ellipse, of which the line 122 is a segment. The position ellipse is the locus of points at which the target could be located and provide the total propagation time of the radar signal from transmitting to receiving antennas. This can be determined very precisely since the propagation time can be measured accurately. Depending upon the particular target location and the overall path length, typical range accuracy can approach a few tens of feet with sophisticated target extractors. However, the azimuth of the target is typically dependent upon the beamwidth of the radar receiving antenna. Even with a beamwith of 0.5°, azimuth accuracy within 5000 feet at a range of 100 nautical miles is difficult to achieve. Therefore, although a moving target is detected with the bistatic radar system of this invention, the accuracy of obtaining its location is no better than would be obtained from a conventional monostatic system.

Figure 5:
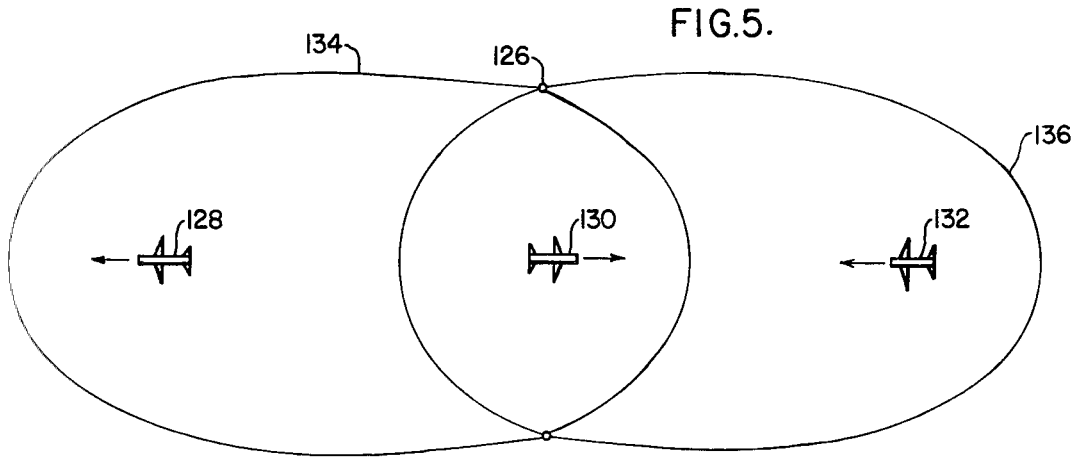
FIG. 5 is a diagram illustrating one arrangement for using the present invention to accurately determine the location of a moving target.

FIG. 5 is a diagram illustrating a radar system arrangement which may be used to greatly improve the accuracy of the calculated target location, either with respect to ground or to the aircraft. The bilateration bistatic radar system illustrated in FIG. 5 uses three aircraft to determine two position ellipses, each containing the target 126. The aircraft 128 and 130 are flying in opposite directions as more fully described in connection with FIG. 2. Similarly, the aircraft 130 and 132 are flying toward each other also as more completely described in connection with FIG. 2. The position ellipse 134 is determined by aircraft 128 and 130 as the possible locations of the target 126 due to knowledge of the radar signal propagation time. Similarly, the position ellipse 136 is determined by aircraft 130 and 132 as the possible locations of the target 126. Since the azimuth determination of the target 126 is limited by antenna beamwidth, the corresponding pair of aircraft cannot alone precisely determine the location of the target 126 on their respective position ellipse. However, since the position of each ellipse is precisely known, the location of the intersection of the two ellipses can be used to accurately and precisely determine the location of the target 126. Although not shown, suitable coordinating and information transfer systems would be used between the aircraft 128, 130 and 132, with or without additional communication with ground facilities.

The radar system arrangements disclosed herein provide a novel means for detecting accurately the position of a slowly moving target. The detection is possible due to the reduction in Doppler spread occasioned by the unique placement of the radar transmitter and receiver aboard different aircraft and by the unique flight patterns of the aircraft.

It is emphasized that, since numerous changes may be made in the above described system and since different embodiments of the invention may be made without departing from the spirit thereof, it is intended that all of the matter contained in the foregoing description, or shown in the accompanying drawing, shall be interpreted as illustrative rather than limiting.

I claim as my invention:

1. A radar system comprising:
    a radar transmitter;
    a transmitting antenna associated with the transmitter;
    first means for moving the radar transmitting antenna along a first path at a first speed;
    a radar receiver;
    a receiving antenna associated with the receiver;
    second means for moving the radar receiving antenna along a second path at a second speed, said transmitting antenna and said receiving antenna being physically remote from each other;
    means for coordinating the scanning of the radar transmitter and receiver antennas;
    said first and second paths having suitable directions and said first and second speeds being of suitable values such that the rate of change of the angle between the first path and a line from the radar transmitter antenna to a target area is substantially equal and opposite to the rate of change of the angle between the second path and a line from the radar receiver antenna to said target area; and
    means for determining when a radar return signal is received by the radar receiver from a target.

2. The radar system of claim 1 wherein the midpoint between the first and second means remains substantially stationary with respect to the target area.

3. The radar system of claim 1 wherein the angular velocity of the first means around the target area is substantially equal and opposite to the angular velocity of the second means around the target area.

4. The radar system of claim 1 wherein the first and second paths are substantially straight lines directed toward each other.

5. The radar system of claim 4 wherein the lines are coincident with each other.

6. The radar system of claim 1 wherein the first and second paths are substantially straight lines directed away from each other.

7. The radar system of claim 6 wherein the lines are coincident with each other.

8. The radar system of claim 1 wherein the first and second speeds are substantially equal.

9. The radar system of claim 1 wherein the means for determining when a radar return signal is received from a target recognizes the shift in the radar frequency due to movement of the target.

10. An airborne radar system for detecting the presence of a moving target, comprising:
    a radar transmitter located on board a first aircraft traveling in a first direction at a first speed;
    a radar receiver located on board a second aircraft traveling in a second direction at a second speed; and
    means for recognizing when a radar return signal has been shifted in frequency due to the movement of the target with the angular velocity of the first aircraft around the target area being substantially equal and opposite to the angular velocity of the second aircraft around the target area, thereby counteracting the radar frequency shift of return signals from stationary objects due to the movement of the radar transmitter and receiver.

11. The airborne radar system of claim 10 wherein the first and second aircraft travel at substantially the same speed along the same line of flight.

12. The airborne radar system of claim 11 wherein the first and second aircraft travel in the same direction.

13. The airborne radar system of claim 11 wheren the first and second aircraft travel in opposite directions.

14. The airborne radar system of claim 10 including at least one additional aircraft suitably equipped with radar apparatus, said third aircraft and one of the first and second aircraft traveling in such directions and at such speeds that the angular velocity of said one of the first and second aircraft around the target area is substantially equal and opposite to the angular velocity of the second aircraft around the target area, and including means for determining the intersection of the two position ellipses recognized by the three aircraft.

* * * * *